J. E. HILL, J. B. SMITH & D. PENNOYER.
Wheels for Vehicles.

No.156,704. Patented Nov. 10, 1874.

Witnesses
William Holmes
William Geo. Cook

Inventor.
Jno E Hill
John B Smith
David Pennoyer
By his Atty Jno E Hill

UNITED STATES PATENT OFFICE.

JOHN E. HILL AND JOHN B. SMITH, OF NEW HAVEN, AND DAVID PENNOYER, OF HARTFORD, CONNECTICUT.

IMPROVEMENT IN WHEELS FOR VEHICLES.

Specification forming part of Letters Patent No. 156,704, dated November 10, 1874; application filed September 6, 1872.

*To all whom it may concern:*

Figure 1:
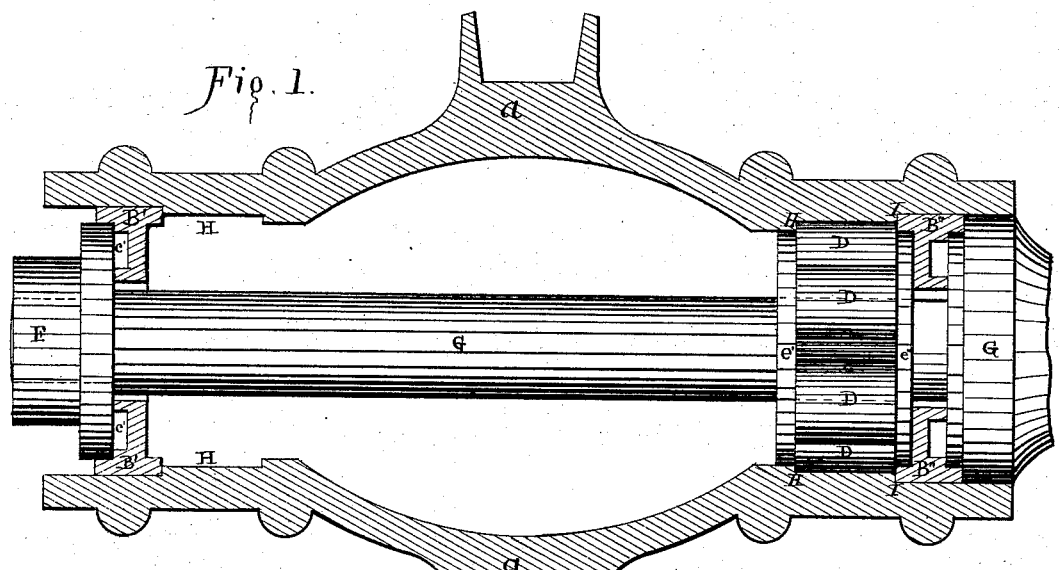
Figure 2:
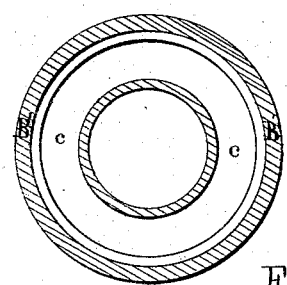
Figure 3:
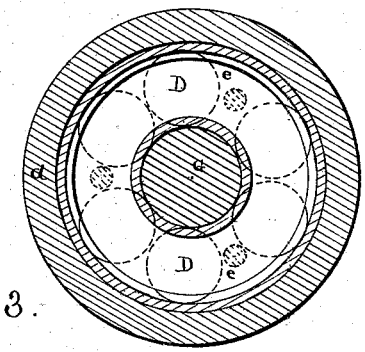
Figure 4:
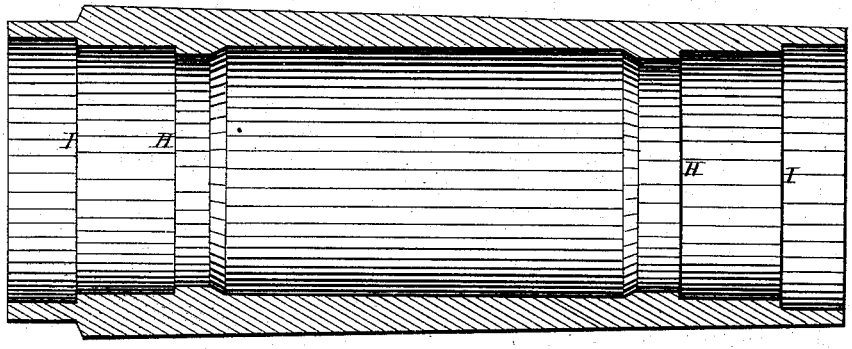

Be it known that we, JOHN E. HILL and JOHN B. SMITH, of the city and county of New Haven, State of Connecticut, and DAVID PENNOYER, of the city and county of Hartford, State of Connecticut, have invented certain Improvements in Wagon-Hubs or Axle-Boxes, of which the following is a specification:

Figure 1 shows a longitudinal sectional view of a wagon-hub with friction-rollers in one end and at the other end the recess for rollers, both ends showing the grooved rings for keeping the rollers in place. Fig. 2 shows an end view of grooved ring. Fig. 3 shows an end view of friction-rollers in wagon-hub. Fig. 4 shows a longitudinal sectional view of axle-box.

Similar letters of reference indicate corresponding parts in the several figures.

The object of this invention is to obtain an arrangement for reducing the friction in axle-boxes or wagon-hubs, and this is accomplished by using rollers in each end of wagon-hub or axle-box, bearing on but a small proportion of the length of axle in hub or box.

$a$ represents an iron hub, in each end of which are formed two shoulders, H I. In order to decrease the friction of the hub against the axle G as much as possible, in each end of the hub is placed a number of independent rollers D, which are journaled between the plates $e'$, these being quite short, and are held in position on one side by the shoulder H, and on the other by the plate or ring B'. These rings B' abut up against the shoulder I, and have a groove, $c'$, formed in their outer sides so as to receive a washer, and a recess on their inner sides to receive one of the plates $e'$.

When the hub is not made, as shown in Fig. 1, of iron, the box of the hub may be made with the shoulders, so as to receive the rollers and rings.

We are aware that the application of friction-rollers to hubs is not new, and we do not desire to claim such.

Having thus described our invention, we claim—

The combination of the shouldered hub or box $a$ with the cages of rollers D and grooved rings B', substantially as and for the purpose set forth.

JNO. E. HILL.
JOHN B. SMITH.
DAVID PENNOYER.

Witnesses:
WILLIAM HOLMES,
HENRY KELSEY.